US008955925B2

(12) United States Patent
Bessette et al.

(10) Patent No.: US 8,955,925 B2
(45) Date of Patent: Feb. 17, 2015

(54) TRACTION ASSEMBLY FOR VEHICLE

(75) Inventors: Robert Bessette, Drummondville (CA); Robert Handfield, Drummondville (CA)

(73) Assignee: Kimpex Inc., Drummondville, Quebec (CA)

( * ) Notice: Subject to any disclaimer, the term of this patent is extended or adjusted under 35 U.S.C. 154(b) by 754 days.

(21) Appl. No.: 13/070,579

(22) Filed: Mar. 24, 2011

(65) Prior Publication Data
US 2012/0242141 A1 Sep. 27, 2012

(51) Int. Cl.
*B62D 55/00* (2006.01)
*B62D 55/14* (2006.01)
*B62D 55/24* (2006.01)
*B62D 55/084* (2006.01)
*B62D 55/108* (2006.01)
*B60G 3/20* (2006.01)

(52) U.S. Cl.
CPC ............... *B62D 55/14* (2013.01); *B62D 55/24* (2013.01); *B62D 55/084* (2013.01); *B62D 55/108* (2013.01); *B60G 3/20* (2013.01); *B60G 2204/30* (2013.01); *B60G 2300/32* (2013.01)
USPC ........... 305/142; 180/9.1; 180/9.21; 305/120; 305/128; 305/131

(58) Field of Classification Search
CPC .............................. B62D 55/30; B62D 55/305
USPC ......... 305/124, 120, 125, 127–131, 134–135, 305/138, 141, 142; 180/9.21, 9.1, 9.5, 9.54, 180/9.56, 9.58
See application file for complete search history.

(56) References Cited

U.S. PATENT DOCUMENTS

| 2,458,549 | A | * | 1/1949 | Bachman et al. | 305/134 |
| 2,467,947 | A | * | 4/1949 | Skelton | 180/9.5 |
| 4,844,195 | A | * | 7/1989 | Deli et al. | 180/9.5 |
| 5,273,126 | A | * | 12/1993 | Reed et al. | 180/9.21 |
| 5,316,381 | A | * | 5/1994 | Isaacson et al. | 305/145 |
| 5,452,949 | A | * | 9/1995 | Kelderman | 305/129 |
| 5,938,247 | A | * | 8/1999 | Santhuff | 280/124.13 |
| 6,095,275 | A | * | 8/2000 | Shaw | 180/185 |
| 6,904,986 | B2 | * | 6/2005 | Brazier | 180/9.21 |
| 7,255,184 | B2 | * | 8/2007 | Loegering et al. | 180/9.26 |
| 7,296,862 | B2 | * | 11/2007 | Albright et al. | 305/145 |
| 7,374,188 | B2 | * | 5/2008 | Hibbert et al. | 280/124.128 |
| 7,690,738 | B2 | * | 4/2010 | Wilt | 305/133 |
| 8,056,655 | B2 | * | 11/2011 | Mallette et al. | 180/9.21 |
| 8,056,656 | B2 | * | 11/2011 | Todd et al. | 180/9.25 |
| 2004/0045747 | A1 | * | 3/2004 | Albright et al. | 180/9.1 |
| 2006/0181148 | A1 | * | 8/2006 | Bessette | 305/124 |
| 2007/0169968 | A1 | * | 7/2007 | Todd et al. | 180/9.1 |
| 2007/0199753 | A1 | * | 8/2007 | Giese et al. | 180/190 |
| 2009/0267407 | A1 | * | 10/2009 | Bessette | 305/135 |
| 2011/0048816 | A1 | * | 3/2011 | Bessette et al. | 180/9.1 |
| 2012/0169113 | A1 | * | 7/2012 | La Spina | 305/132 |
| 2012/0242142 | A1 | * | 9/2012 | Kautsch et al. | 305/142 |

* cited by examiner

*Primary Examiner* — James English
(74) *Attorney, Agent, or Firm* — Robert Brouillette; Brouillette & Partners

(57) ABSTRACT

The present invention generally provides a wheel replacing traction assembly which uses, for propulsion, a longitudinally extending traction band disposed around and cooperating with a sprocket wheel, a supporting structure, and idler and/or road wheels. The supporting structure of the traction assembly comprises an independent suspension generally replacing the suspension of the vehicle. In use, the suspension of the vehicle is replaced by a rigid member that can be adjustable in length in a further embodiment. The presence of a suspension in the supporting structure of the traction assembly decreases its unsprung mass.

12 Claims, 14 Drawing Sheets

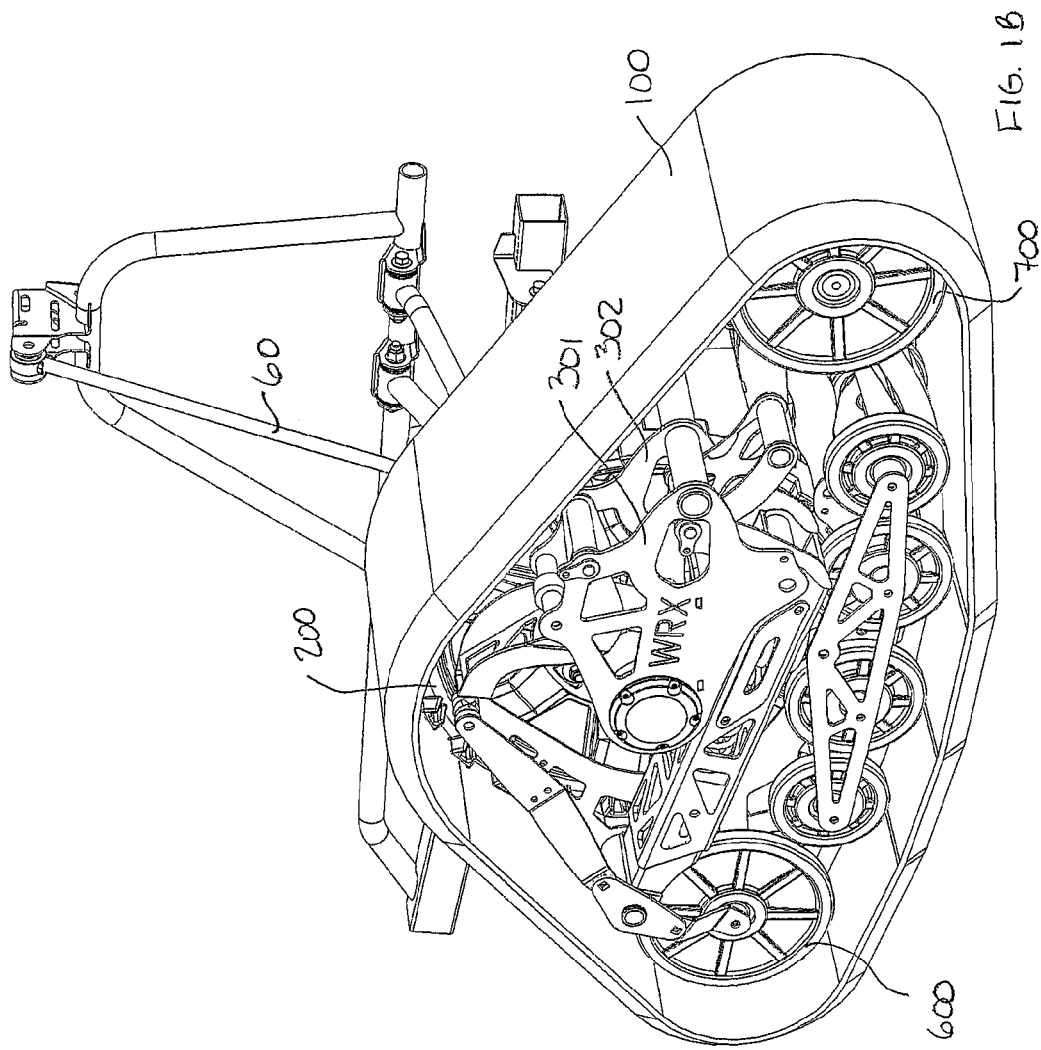

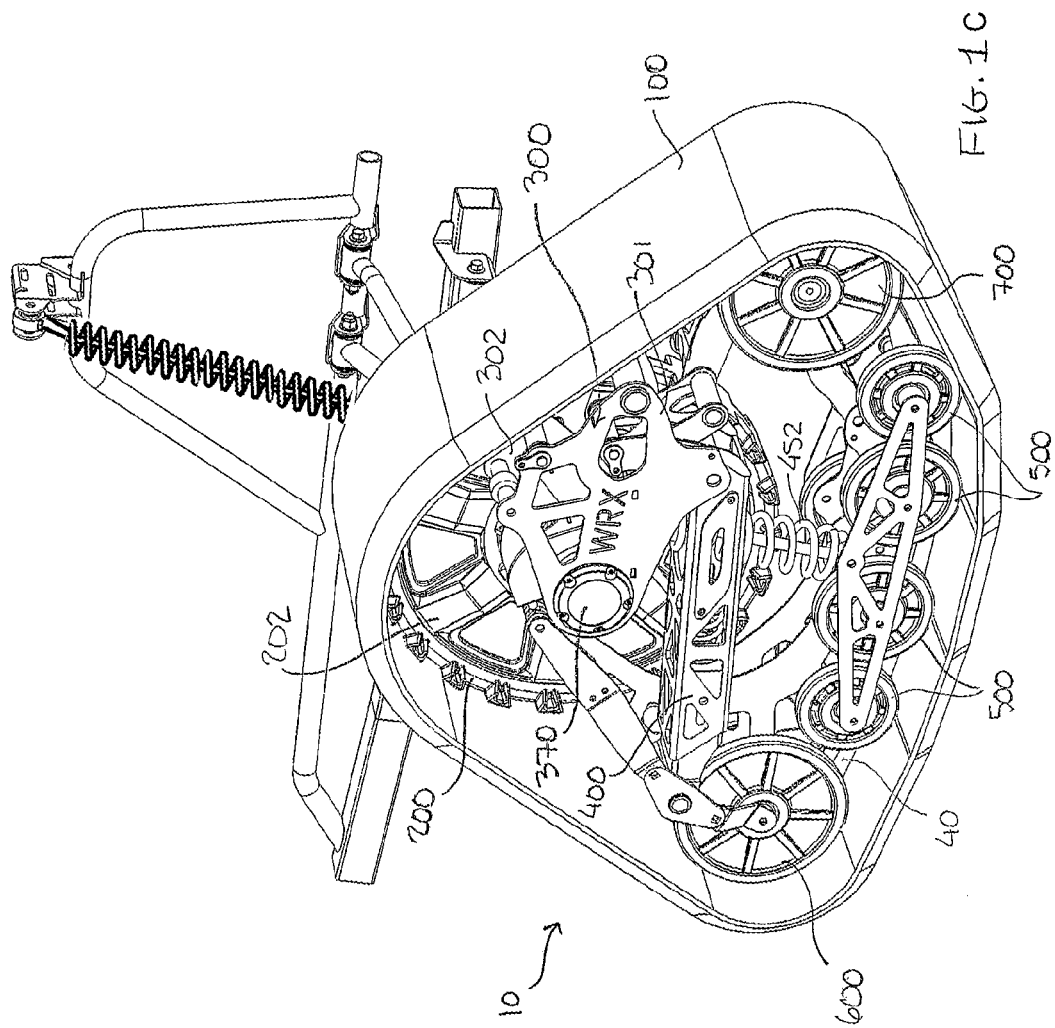

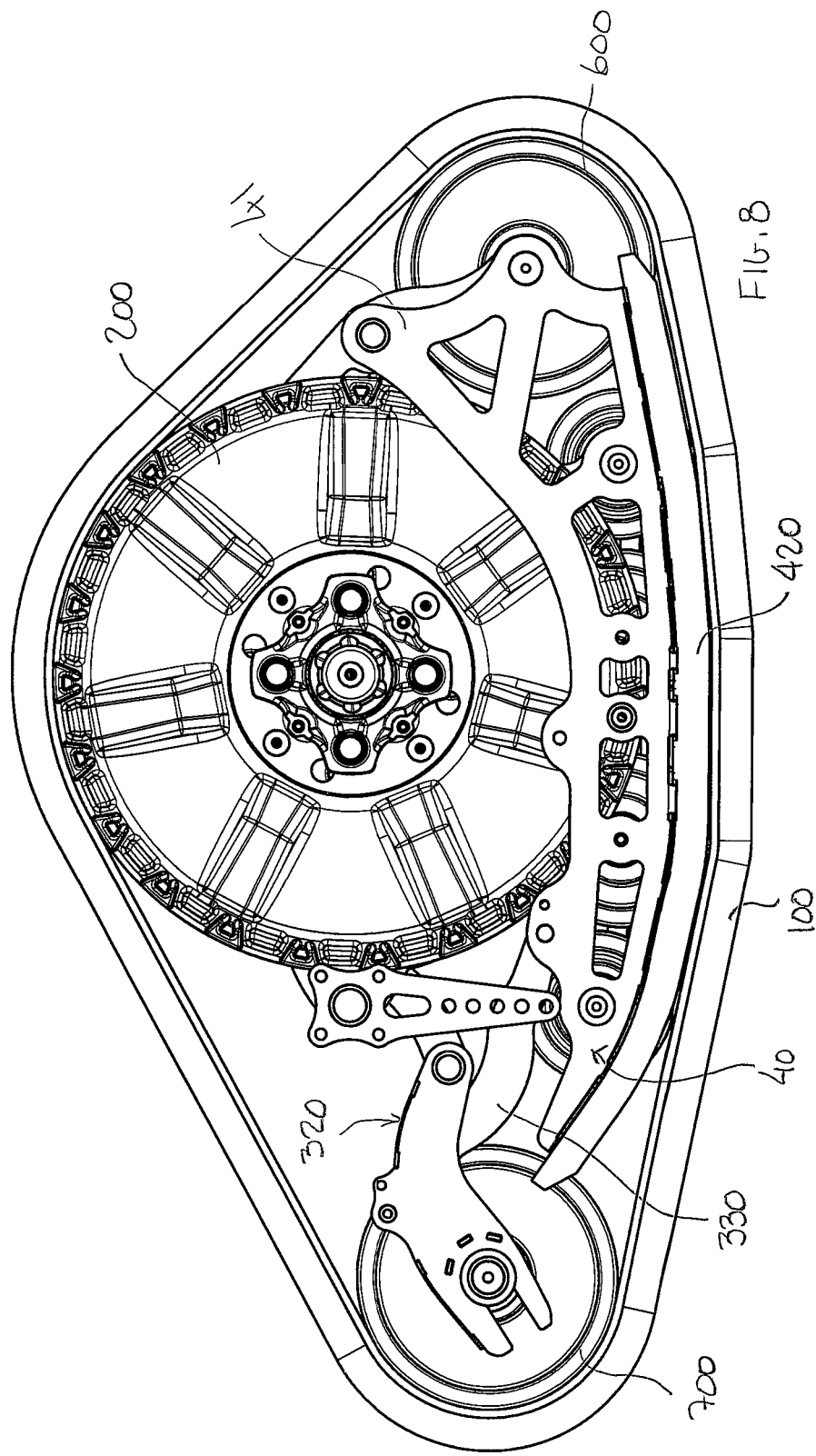

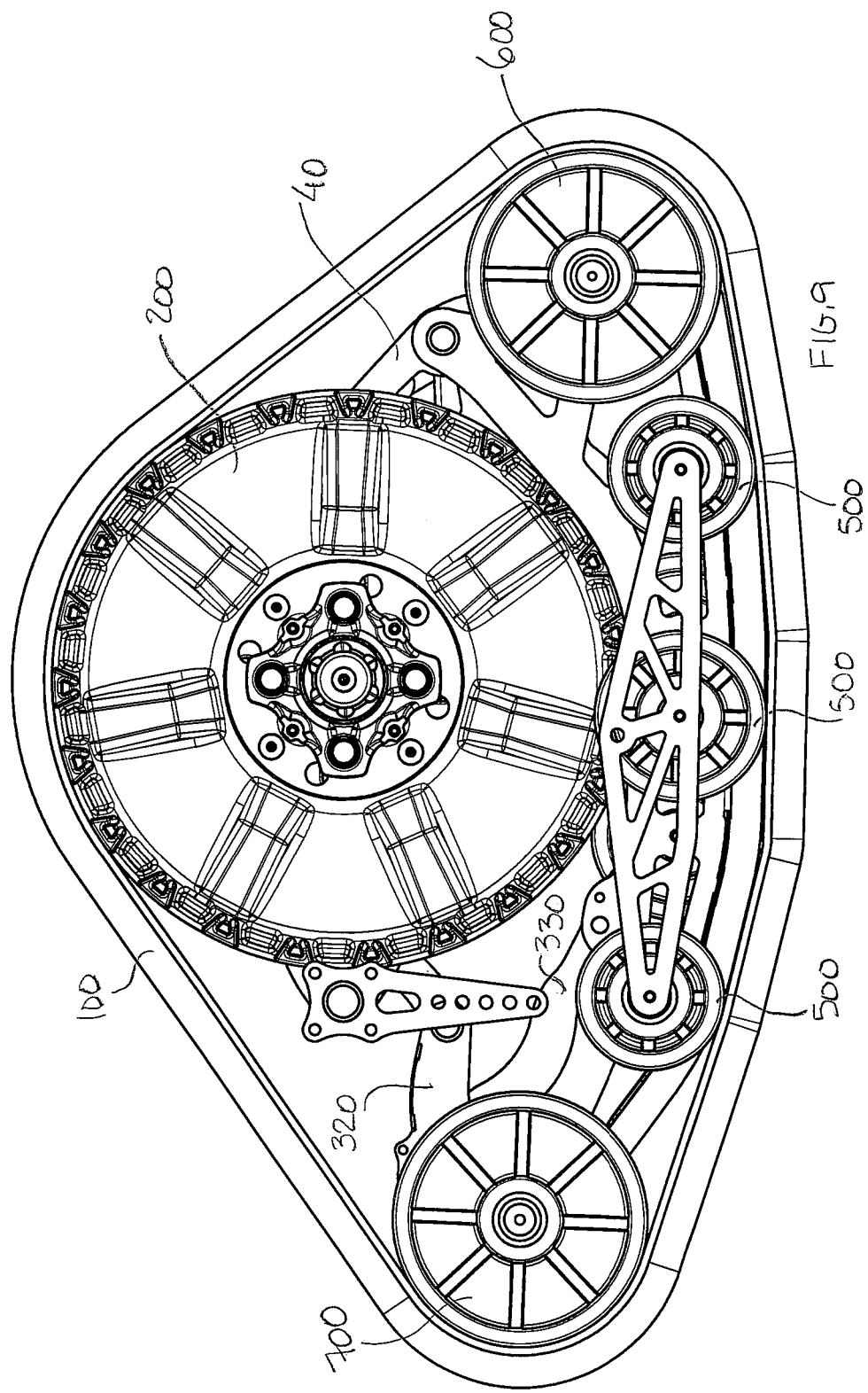

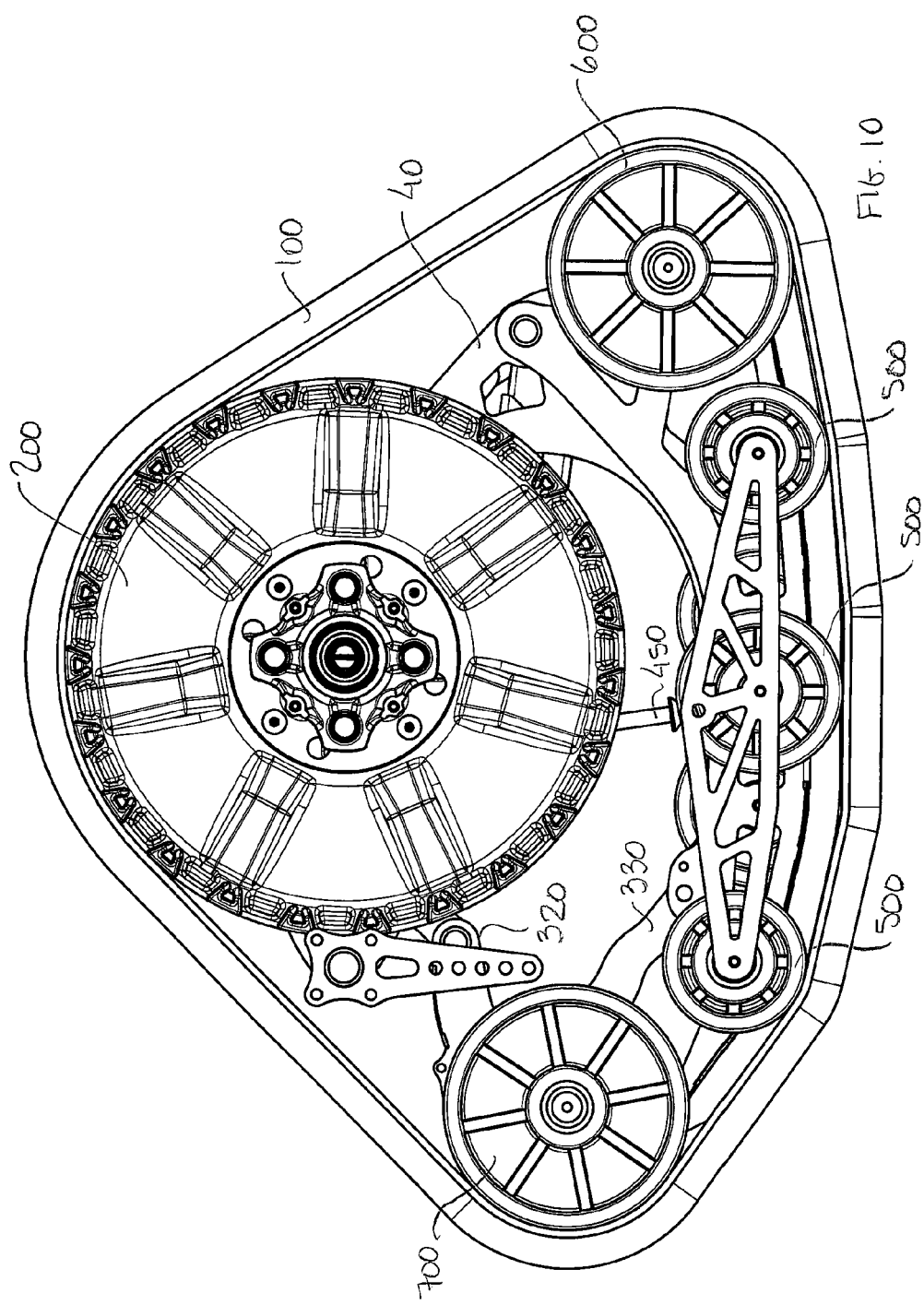

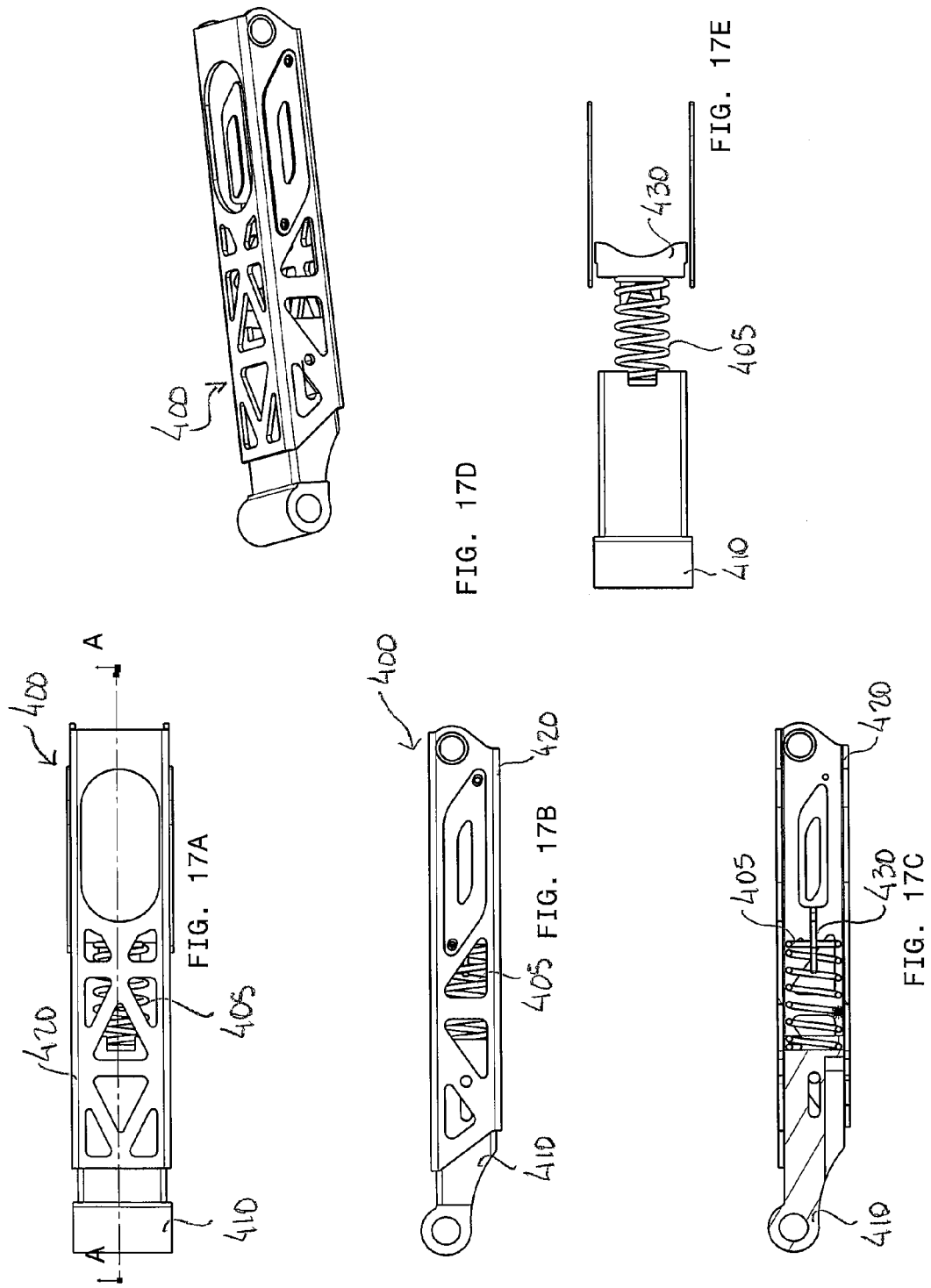

TRACTION ASSEMBLY FOR VEHICLE

CROSS-REFERENCE TO RELATED APPLICATIONS

There are no cross-related applications.

FIELD OF THE INVENTION

The present invention generally relates to traction assemblies and track systems typically used as wheel replacements for wheeled vehicles. More particularly, the present invention relates to traction assemblies and track systems for use as wheel replacements for all-terrain vehicles (ATV), utility terrain vehicles (UTV) and other similar vehicles.

BACKGROUND OF THE INVENTION

Tractions assemblies for use as wheel replacement on wheeled vehicles are known in the art. Indeed, several configurations of traction assemblies have been proposed throughout the years in order to generally improve different aspects and characteristics such as the riding behaviour.

While the riding behavior is one of the most important aspects involved in the concept of a vehicle, the ability to allow interchangeability of parts or to retrofit new components on existing vehicles greatly satisfies the owner of vehicles and represents an interesting market source for vendors of specialized parts destined to vehicles such as snowmobiles, motorcycles, ATVs, tractors, trucks, etc.

For instance, different riding assemblies are sometimes installed to replace the wheels of existing vehicles. In principle, the assemblies should minimize the need to change existing components, must be able to fit on the vehicle without interference and should try to minimize any negative change to the overall riding behavior of the vehicle and comfort of the driver.

However, by replacing the wheels by traction assemblies, or track systems, the mass distribution of the sprung and unsprung mass of the vehicle is modified. Indeed, the mass of a traction assembly is usually superior to the mass of the replaced wheel. By increasing the unsprung mass of a vehicle, it causes a change in the mass repartition (ratio sprung/unsprung mass) and may cause the springs and shock absorbers to be less effective in controlling the suspension's movement, it can cause discomfort for the user and it negatively affects vehicle handling.

There is therefore a need for a traction assembly which improves riding condition when traction assemblies are used to replace existing wheels on vehicles.

SUMMARY OF THE INVENTION

The principles of the present invention are generally embodied in a traction assembly which uses, for propulsion, a longitudinally extending traction band or endless track disposed around and cooperating with a sprocket wheel, a supporting structure, and idler and/or road wheels. The supporting structure of the traction assembly comprises a suspension comprising a spring assembly and a dampener. In use, the suspension of the vehicle is typically replaced by a rigid bar or member and the dampening is assured by the suspension of the traction assembly.

In a further preferred embodiment, the suspension of the vehicle is replaced with a rigid member that is adjustable in length, for example by using an electric or pneumatic adjusting device. The adjustable rigid member allows the modification of the height of the vehicle following the driver needs. The height of the vehicle may be modified to adjust ground clearance or to modify the height of the gravity center of the vehicle. In addition, according to one aspect of the present invention, least one of the linkages comprises an aperture entirely overlapping the circumference of the suspension at a specific position along the suspension.

It is to be noted that the present invention could be used with a vehicle that does not comprises a suspension, such as a tractor.

The present invention involves a traction assembly that can preferably replace a wheel on vehicle. Preferably, the traction assembly can replace wheels on either side of the front portion and/or the rear portion of the vehicle.

In a ground vehicle with a suspension, the sprung mass (or sprung weight) is the portion of the vehicle's total mass that is supported by the suspension, including in most applications an important proportion (half or more) of the mass of the suspension itself. The sprung mass typically includes the body, the frame, the internal components of the vehicle, the passengers, etc. The sprung mass does not include the mass of the components below the suspension components. The unsprung mass (or the unsprung weight) is the mass of the suspension (usually half the mass of the suspension), wheels or tracks (as applicable), and other components directly connected to the suspension (such as the hub, the disk brake, etc. . . . ), rather than supported by the latter, or the mass following the ground.

The larger the ratio of sprung mass to unsprung mass, the less the body and vehicle passengers are affected by bumps and other surface imperfections.

Usually, in devices of prior art, all the mass of the traction assemblies replacing wheels are considered unsprung mass. The presence of a suspension in the support structure of the traction assembly allows a part of its mass to become sprung mass; the unsprung mass of the vehicle is thus reduced and it improves the riding comfort.

Other aspects and many of the attendant advantages will be more readily appreciated as the same becomes better understood by reference to the following detailed description and considered in connection with the accompanying drawings in which like reference symbols designated like elements throughout the figures.

BRIEF DESCRIPTION OF THE DRAWINGS

The above and other objects, features and advantages of the invention will become more readily apparent from the following description, reference being made to the accompanying drawings in which:

FIG. 1B is a perspective view of a traction assembly in accordance with the principles of the present invention, in a compressed configuration.

FIG. 1C is a perspective view of a traction assembly in accordance with the principles of the present invention, as installed at the front right of a vehicle having the original vehicle suspension attached thereto.

FIG. 8 is a partial inner side view showing the position of the sprocket wheel when the dampener is in a fully compressed configuration.

FIG. 9 is a partial inner side view showing the position of the sprocket wheel when the dampener is in a partially compressed configuration.

FIG. 10 is a partial inner side view showing the position of the sprocket wheel when the dampener is in an uncompressed configuration.

FIG. 17A is a top view of a spring assembly used with the present traction assembly.

FIG. 17B is a side view of the spring assembly of FIG. 17A.

FIG. 17C is a cross-section view of the spring assembly of FIG. 17A, along line A-A.

FIG. 17D is a perspective view of the spring assembly of FIG. 17A.

FIG. 17E is a partial view of the spring assembly of FIG. 17E.

DETAILED DESCRIPTION OF THE PREFERRED EMBODIMENT

A novel traction assembly for vehicle will be described hereinafter. Although the invention is described in terms of specific illustrative embodiments, it is to be understood that the embodiments described herein are by way of example only and that the scope of the invention is not intended to be limited thereby.

The following description will be made according to embodiments of the present invention designed to be installed on ATVs, UTVs, and other similar vehicles such as tractors, military cars or trucks. However, it is to be understood by the skilled addressee that the present invention can be adapted for any wheeled vehicles. Therefore, variants of the present invention adapted to be used on trucks, tractors and other similar vehicles fall inside the scope of the present invention.

The traction assembly 10 can replace the front and/or the rear wheels, or the skis assemblies, of a vehicle. Other vehicles designed to ride on irregular, snowy, sandy, muddy or softer terrains can also incorporate the use of traction assembly 10. The traction assemblies 10 can be mounted on each side of the front and rear portion of a vehicle.

The present traction assembly comprises linkages and a suspension comprising a dampener and a spring assembly allowing a part of the traction assembly to be part of the sprung mass of the vehicle. The suspension of the vehicle, if the vehicle has one, that is connected to the chassis and to the wheel is replaced by a rigid member. The suspension function for the vehicle is assumed by the suspension of the traction assembly. The linkages are articulated and allow the traction assembly to follow the movement of the dampener and of the spring assembly when the vehicle passes over bumps or depressions on the ground.

Figure 1A:
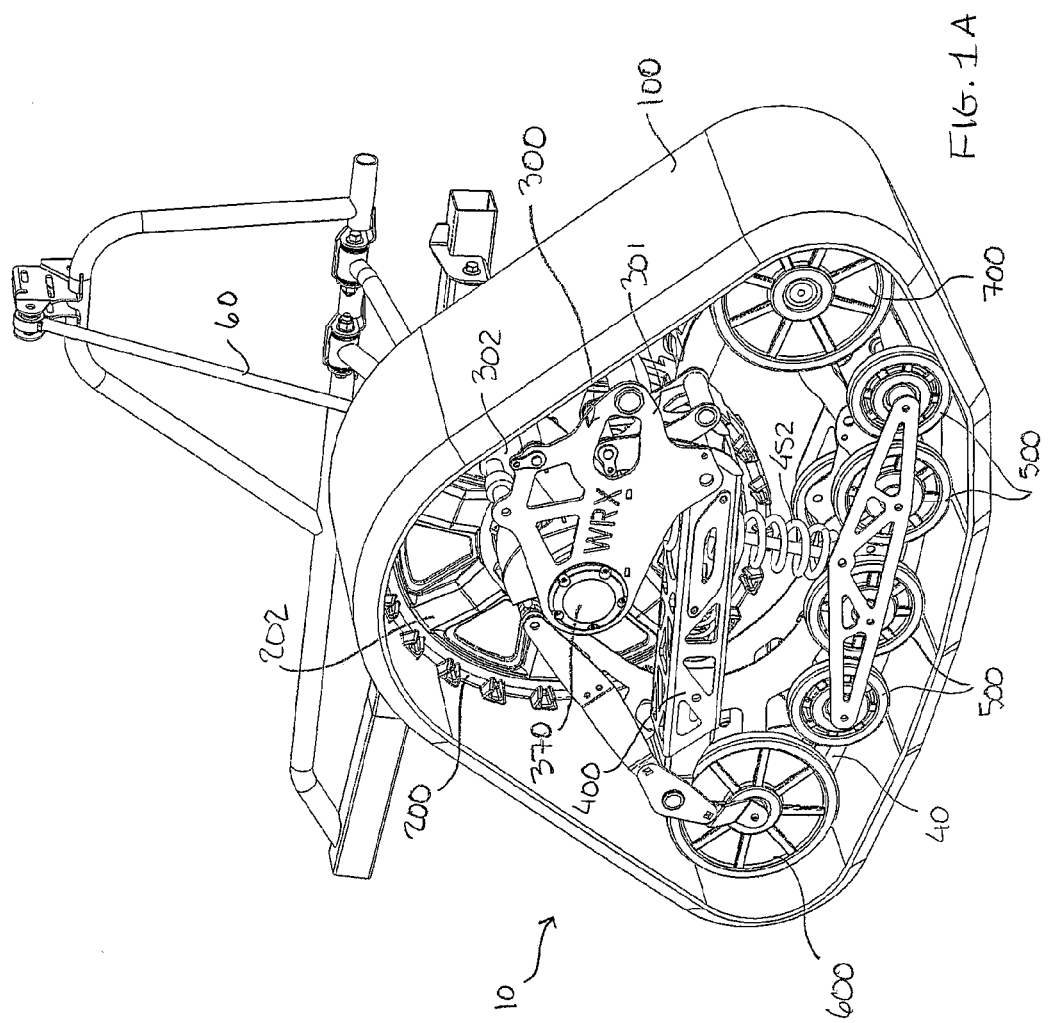
FIG. 1A is a perspective view of a traction assembly in accordance with the principles of the present invention, as installed at the front right of a vehicle.
Figure 2:
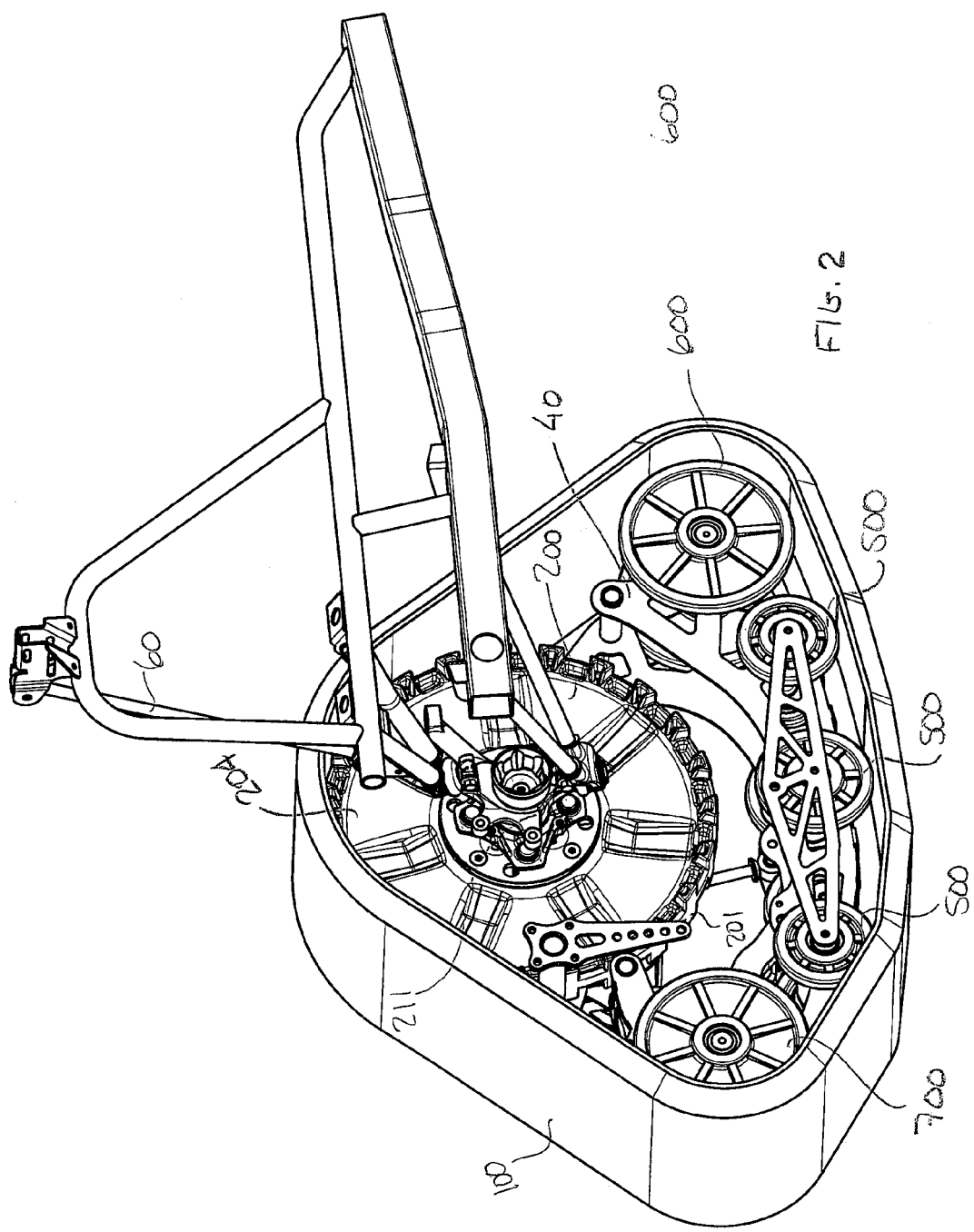
FIG. 2 is another perspective view of the traction assembly of FIG. 1.
Figure 3:
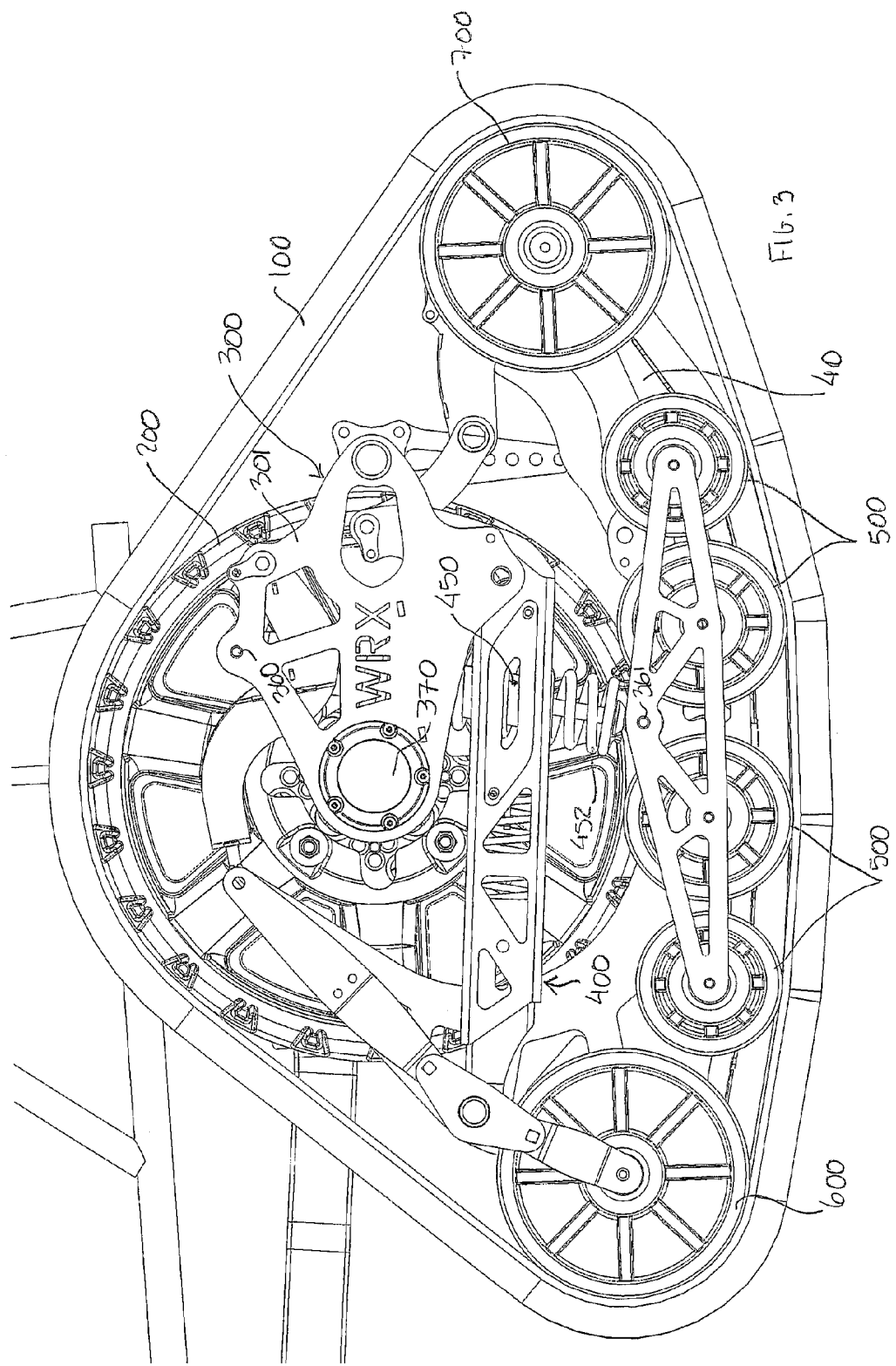
FIG. 3 is an outer side view of the traction assembly of FIG. 1.

Referring first to FIGS. 1 to 3, a traction assembly 10 embodying the principles of the invention is shown. The traction assembly 10 comprises a sprocket wheel 200 adapted to be mounted to a shaft of a wheeled vehicle (not shown), frame elements 301 and 302 coupled to the sprocket wheel 200 through the mounting axle 370, a guide rail 40, idler wheels 600 and 700 respectively mounted at the fore and at the aft of the guide rail 40, and road wheels 500 mounted along the length of the guide rail, typically on each side thereof.

The traction assembly 10 also comprises a traction band 100, typically but not necessarily made of reinforced elastomeric material. The traction band 100 has an inner surface configured to cooperate, via a plurality of typically longitudinally aligned drive lugs and guide lugs (not shown for clarity), with the sprocket wheel 200, the idler wheels 600 and 700, the road wheels 500 and the guide rail 40. The traction band 100 also has an outer surface comprising a plurality of traction lugs (not shown for clarity) configured to engage the ground onto which the traction assembly 10 is operated.

The traction assembly comprises a suspension comprising a dampener 450 and a spring assembly 452 that will be described in more details here after.

The sprocket wheel 200 is typically circular in shape and preferably, but not exclusively, made from light yet resistant material such as ultra high molecular weight polyethylene ("UHMW-PE"). Still, other material could be used; the present invention is not so limited.

In the present embodiment, the sprocket wheel 200 defines a first side 202, a second side 204. Respectively laterally extending from the first surface 202 and the second surface 204 are equally spaced sprocket teeth. The sprocket teeth are configured to conventionally engage the drive lugs (not shown) disposed on the inner surface of the traction band 100. The sprocket wheel 200 also comprises a central bore 211 configured to receive ball bearings (not shown) and the mounting axle 370. Disposed around the central bore are four smaller bores configured to receive the fasteners used to secure the sprocket wheel 200 to the shaft or wheel hub of the vehicle. Understandably, the number of bores can vary according to the configuration of the shaft (not shown) onto which the sprocket wheel 200 will be mounted; the present invention is thus not limited to four bores.

As the skilled addressee will understand, the present traction assembly 10 is generally not limited to a particular configuration of sprocket wheel.

Figure 15:
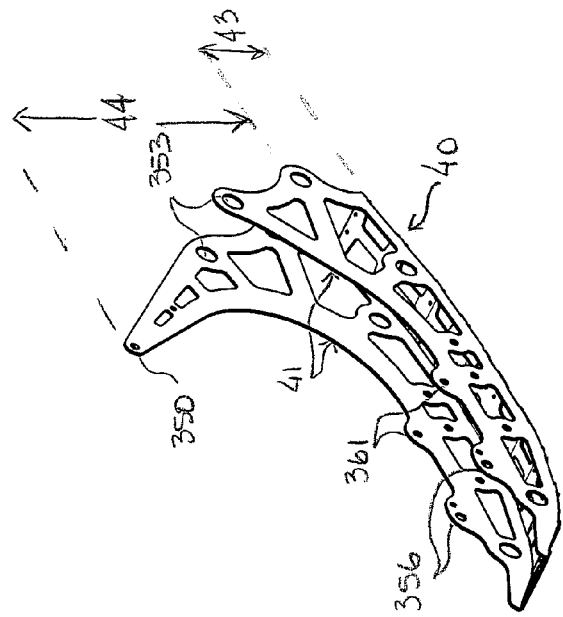
FIG. 15 is a perspective view of the guide rail.
Figure 12:
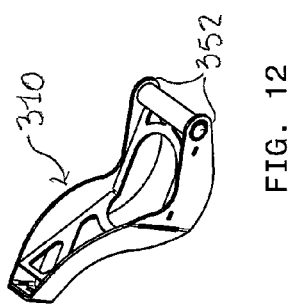
FIG. 12 is a perspective view of the first linkage.
Figure 13:
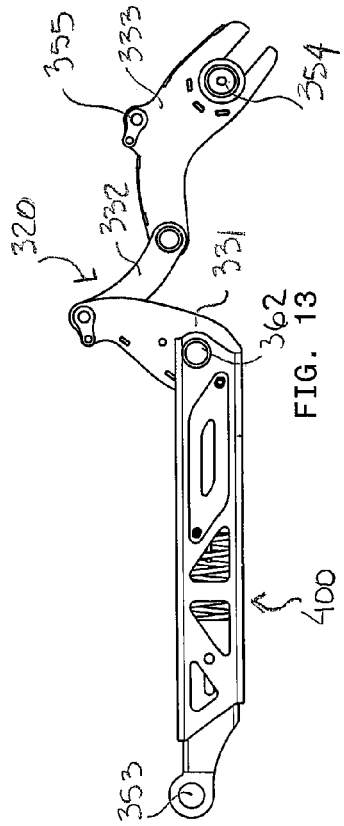
FIG. 13 is a front view of the second linkage.

Referring now to FIG. 8, the guide rail 40 is coupled with a slider 420 which longitudinally or circumferentially extends in such a way as to give form to the traction band 100. As shown in more details in FIG. 15, the guide rail 40 comprises two lateral walls 41 adapted to receive the sprocket wheel 200. The guide rail 40 comprises pivot points that are adapted to receive a pivot joint on which the linkages, that will be described hereafter, will be connected.

The frame 300 comprises the frame elements 301 and 302.

Referring now to FIG. 3, the suspension of the traction assembly 10 comprises a dampener 450 and a spring assembly 452. The dampener 450 is pivotally connected to the frame 300 through the pivot joint 360 and to the guide rail 40 through the pivot joint 361.

Figure 7:
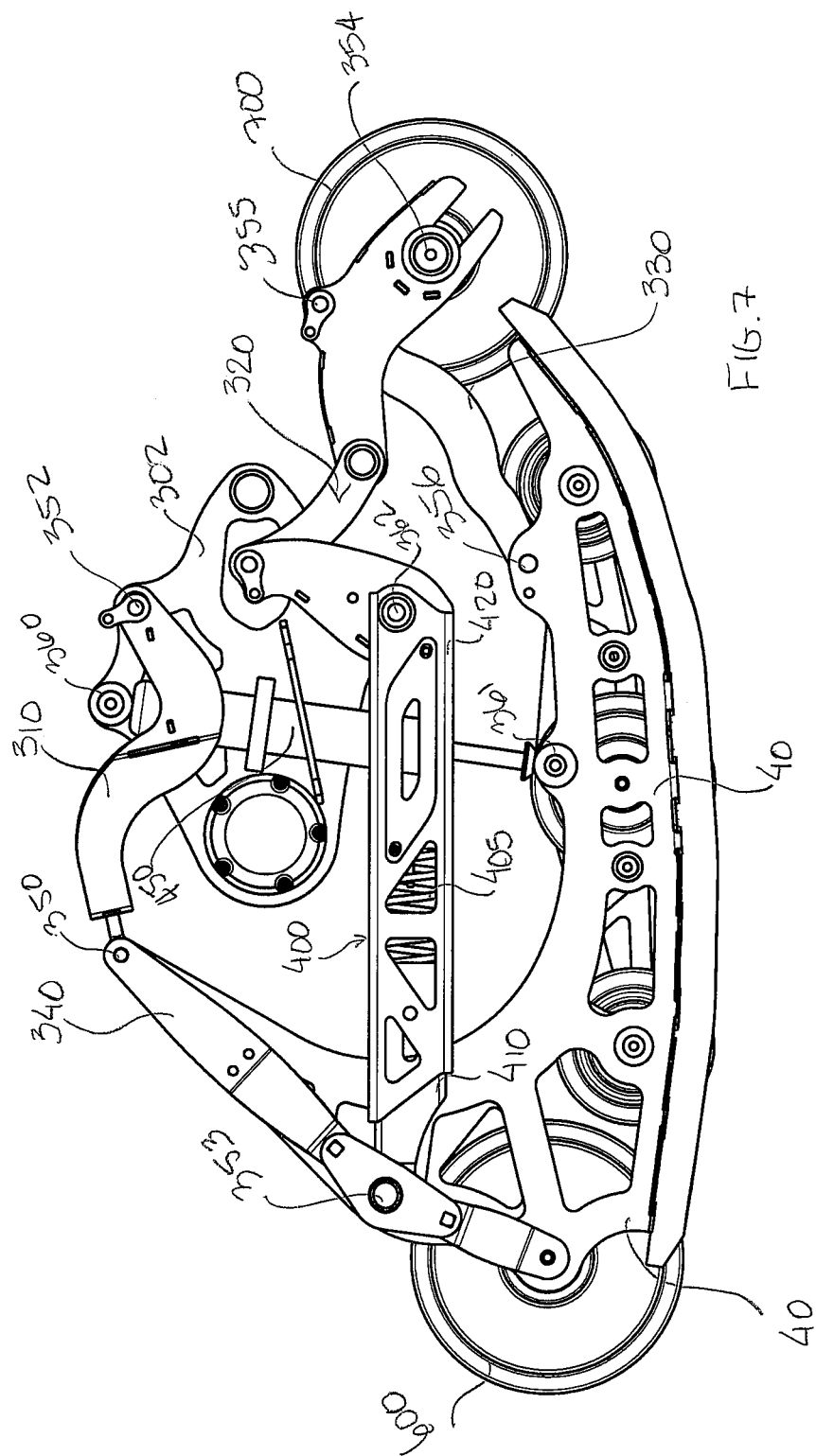
FIG. 7 is a partial outer side view showing more particularly the linkage of the traction assembly.
Figure 14:
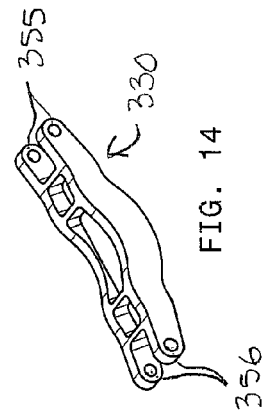
FIG. 14 is a perspective view of the third linkage.

Now referring to FIG. 7, comprising only some parts of the traction assembly to facilitate viewing of the different parts of the traction assembly, the traction assembly 10 comprises a plurality of articulated linkages 310, 320 and 330. The member 340 is used as reinforcement.

Figure 11:
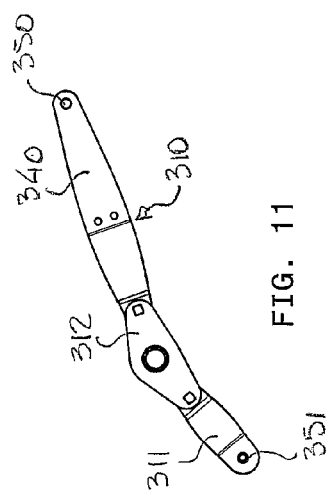
FIG. 11 is a front view of the reinforcing member.

Referring to FIGS. 4 to 6, FIG. 7 and to FIG. 11, the first linkage 310 comprises only one linking member. The second linkage 320 comprises the linking members 331, 332 and 333 and the extendable linking member 400. The member 340 is interconnected to the second linkage 320 as best illustrated in FIG. 7. The third linkage 330 comprises only one linking member. The different linking members of the linkages are connected together with pivot joints. It is to be understood that the number and the configuration of the linkages are not limited to the version shown in the present preferred embodiment. Indeed, the function of the linkages is to allow the mobility of the sprung mass of the traction assembly relatively to the unsprung mass and this could be achieve with other configurations of linkages.

The extendable linking member 400 is interconnected to the guide rail 40 and to the second linkage 320. The extendable linking member 400 comprises a spring 405, a first portion 410, a second portion 420 and a retaining portion 430 shown in FIGS. 17A to 17E. The spring 405 is connected to the first portion 410 and to the retaining portion 430, the retaining portion 430 being connected to the second portion 420. The first portion 410 is adapted to slide into said second portion 420 to follow the compression and extension of the spring 405. The function of the extendable linking member 400 is to establish the optimum tension in the traction band to compensate for the modification of its length in use. The length of the traction band may slightly vary due to the presence of the suspension that change the configuration of the traction assembly and consequently the perimeter formed by the sprocket wheel 200, idler wheels 600 and 700, and road wheels 500. The extendable linking member 400 prevent the traction band 100 to become too loose or too stretched following the modification of the perimeter formed by the sprocket wheel, the idler wheels and the road wheels. In the preferred embodiment, the extendable linking member 400 preferably comprises an aperture through which the suspension assembly typically extends.

Figure 4:
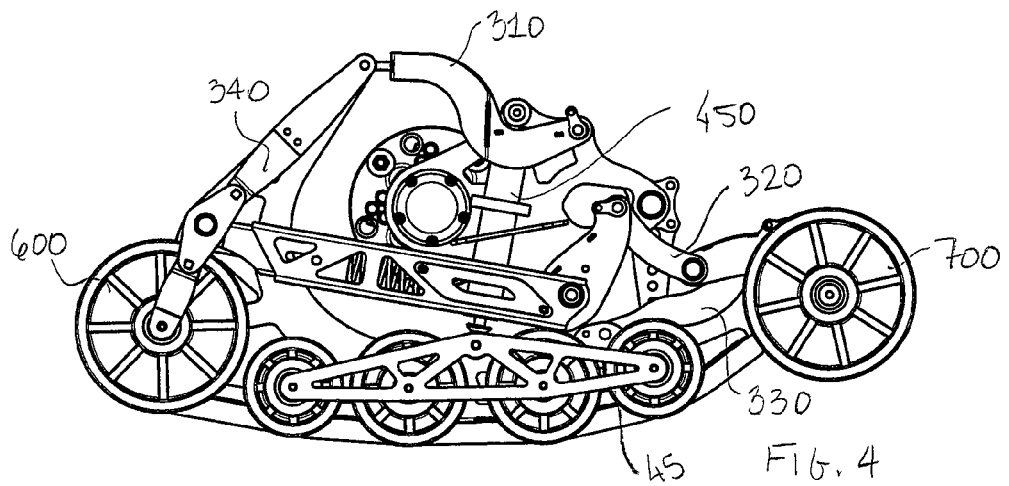
FIG. 4 is a partial outer side view of the traction assembly of FIG. 1 with the dampener in a fully compressed configuration.
Figure 5:
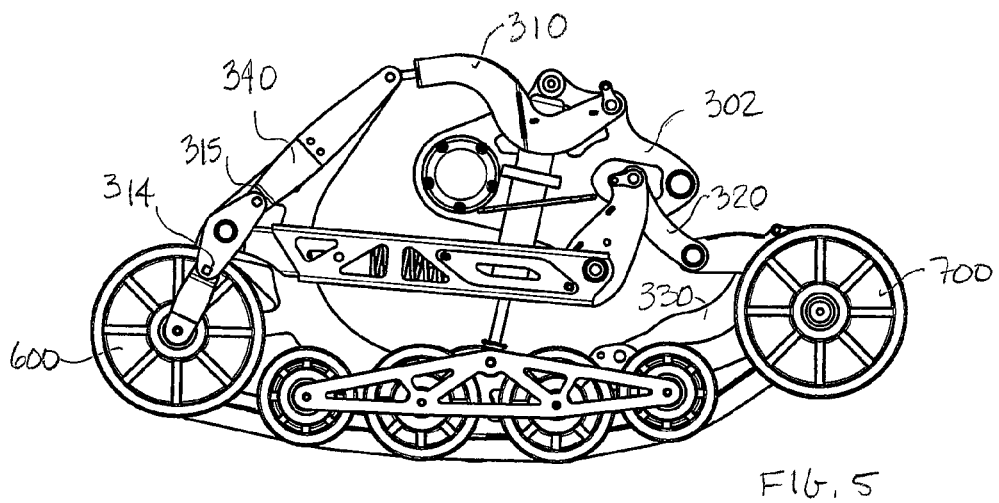
FIG. 5 is a partial outer side view of the traction assembly of FIG. 1 with the dampener in a partially compressed configuration.
Figure 6:
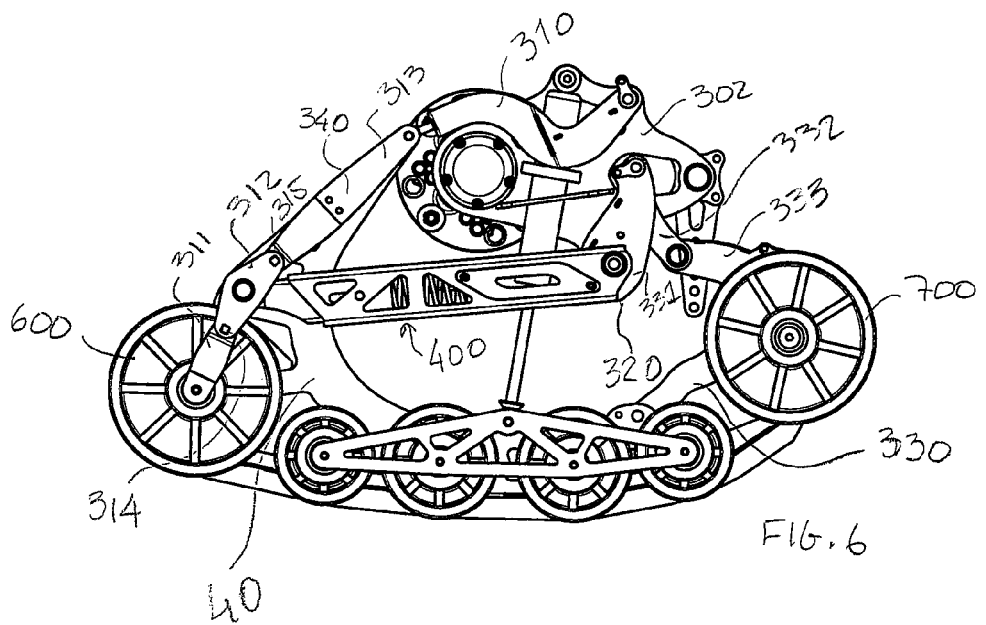
FIG. 6 is a partial outer side view of the traction assembly of FIG. 1 with the dampener in an uncompressed configuration.

As it can be seen in FIG. 4 to FIG. 6, the position of the wheel 700 and of the third linkage 330 is variable. In FIG. 4, the position of the wheel 700 is higher than the configuration shown in FIG. 6, relatively to the guide rail 40.

As explained previously, the linkages are connected through pivot joints that are illustrated in more details in FIG. 7. The extremities of the first linkage 310 are connected to the upper portion 44 of the guide rail 40 at pivot joint 350 and to the frame 300 at pivot joint 352. The second linkage 320 is interconnected to the member 310 by the extendable linking member 400. As best illustrated in FIG. 7, the first portion 410 of the extendable linking member 400 is pivotally connected to the member 310 at pivot joint 353 while the second portion 420 is pivotally connected to the guide rail 40 at pivot joint 362. The second linkage 320 is further pivotally connected to the third linkage 330 at pivot joint 355. Finally, the third linkage 330 is connected to the second linkage 320 at pivot joint 355 and to the lower portion 43 of the guide rail 40 at pivot joint 356. Notably, as best shown in FIG. 7, the pivot joint 356 is typically located at the front (or fore) of the lower portion 43. It is to be noted that the pivot joints described above, namely 350, 352, 353, 355 and 356, have a rotation axis that is substantially perpendicular to the rotation axis of the sprocket wheel 200. Pivot joints for such use are already known in prior art.

The frame 300 is connected to the sprocket wheel 200 through the mounting axle 370. The frame 300 is also connected to the upper extremity of the dampener 450 through pivot joint 360. The frame 300 is connected to the first linkage 310 through pivot joint 352 and to the second linkage 320 through pivot joint 362.

To install the traction assembly of the present invention on a vehicle, the user dismounts the wheels of the vehicle and fixes traction assemblies 10 on the mounting axle 370. The suspension of the vehicle is dismounted and replaced by a rigid member 60, as shown in the Figures and more particularly in FIG. 1.

As it can be seen more particularly in FIGS. 4 to 6, the configuration of the traction assembly 10 changes according to the compression and the decompression of the dampener 450 and of the spring assembly 452.

In the present traction assembly 10, the unsprung mass comprises the idler wheel 600 and 700, the road wheel 550 and the support structure 45, the member 310, the third linkage 330, the guide rail 40. It is approximated that half the mass of the first linkage 310, of the second linkage 320 and of the suspension is considered to be unsprung mass and the other half is sprung mass. The sprocket wheel 200, the frame 300 and the elements connecting the sprocket wheel 200 to the vehicle are part of the sprung mass.

The linkages comprise articulated or pivot joints providing two-dimensional adjustability to follow the compression and decompression of the dampener 450, of the spring assembly 452 and of the extendable linking member 400. This adjustability allows the traction band to maintain substantially the same predetermined length (the perimeter formed by the external surface of the sprocket wheel 200, the idler wheels 600 and 700 and the road wheels 500) during the operation of the vehicle.

As it can be seen in FIGS. 8 to 10, the position of the sprocket wheel 200 varies with the compression and decompression of the dampener 450 and of the spring assembly 452. In the lowest position shown in FIG. 8, the sprocket wheel is received between the lateral walls 41 of the guide rail 40 (shown in more detail in FIG. 15).

Referring to FIGS. 4 to 6, the position of the idler wheel 700 varies according to the movement of the second linkage 320 and the third linkage 330.

Figure 16A:
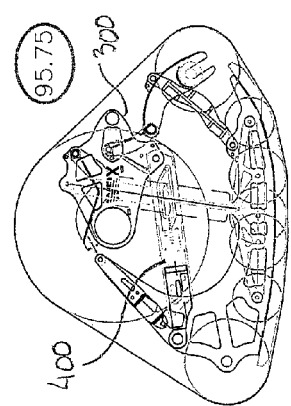
FIGS. 16A to 16E show the configuration of the traction assembly for different dampener compression state, from an uncompressed state in FIG. 16a to a fully compressed state in FIG. 16e.
Figure 16B:
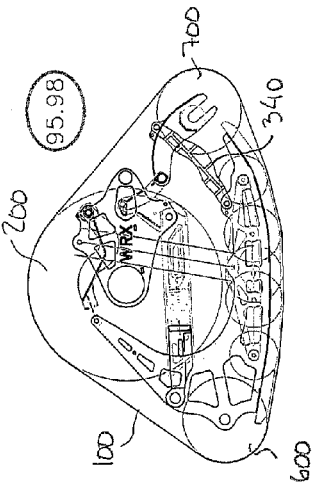
Figure 16C:
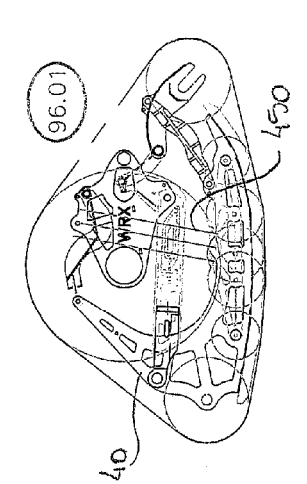
Figure 16D:
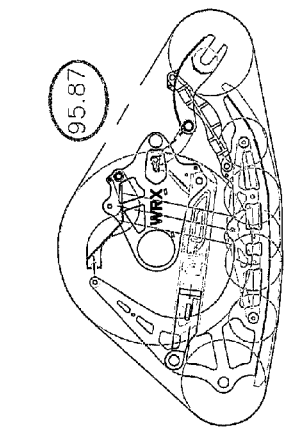
Figure 16E:
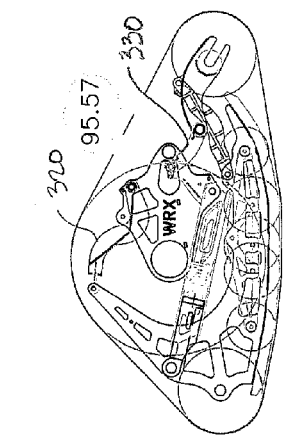
Figure 16F:
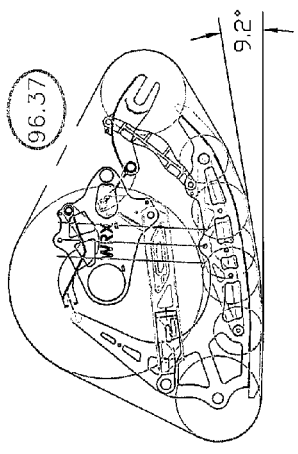
FIGS. 16F and 16G show the angle between the ground and the lower run of the traction band.
Figure 16G:
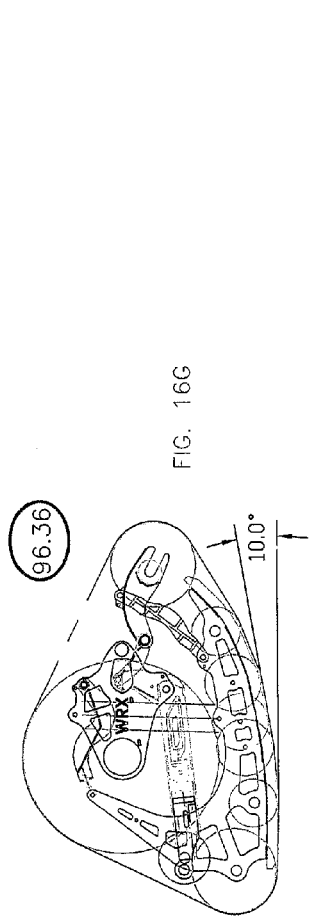

FIGS. 16a to 16e show the configuration of the traction assembly for different dampener compression state, from an uncompressed state in FIG. 16a to a fully compressed state in FIG. 16e. FIGS. 16f and 16g show the angle between the ground and the lower run of the traction band that the traction assembly can adopt when passing over a bump or a depression on the ground.

Figure 18:
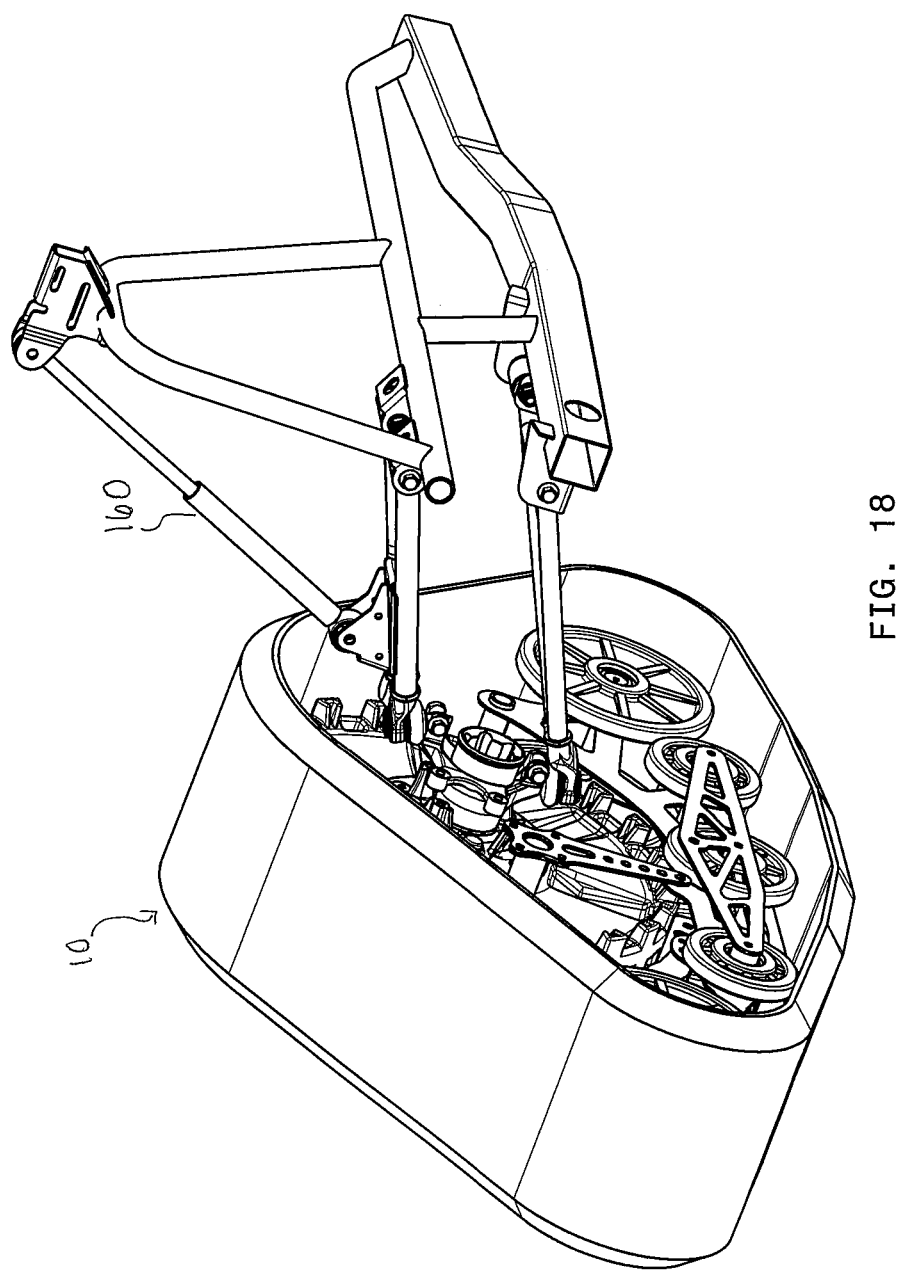
FIG. 18 is a perspective view of the traction assembly comprising an adjustable rigid member.

FIG. 18 illustrates another embodiment of the invention wherein the suspension of the vehicle has been replaced with an adjustable rigid member 160. The height of the adjustable rigid member 160 may be modified by the driver of the vehicle. The adjustable rigid member 160 may be actuated using a pneumatic or electric device, for example.

The present invention provides a traction assembly having a lower unpsrung mass compared to traction assemblies of prior art, where substantially all the traction assembly is considered to be unsprung mass. This is achieved by providing a traction assembly having a suspension allowing a part of the mass of the traction assembly to become sprung mass. By decreasing the unsprung mass, the comfort of passengers using an ATV with the present traction assembly is increased.

While illustrative and presently preferred embodiment(s) of the invention have been described in detail hereinabove, it is to be understood that the inventive concepts may be otherwise variously embodied and employed and that the appended claims are intended to be construed to include such variations except insofar as limited by the prior art.

The invention claimed is:

1. A traction assembly for a vehicle, said traction assembly comprising:
   a) a sprocket wheel mountable to the vehicle;
   b) a frame,
   c) a guide rail pivotally supporting a plurality of wheels;
   d) a suspension assembly comprising a spring assembly and a dampener, said suspension assembly being pivotally connected to said frame and to said guide rail;
   e) a plurality of articulated linkages pivotally interconnecting said frame and said guide rail;
   f) a traction band disposed about said sprocket wheel and said plurality of wheels, said traction band having a predetermined perimeter;
   wherein said frame, guide rail, suspension assembly and plurality of linkages define a variable geometry, wherein said variable geometry changes according to the compression and extension of said suspension assembly while substantially maintaining said predetermined perimeter of said traction band during of the operation of the vehicle and wherein at least one of said plurality of linkages comprises are aperture and wherein said suspension assembly extends through said aperture.

2. The traction assembly of claim 1, wherein said frame is connected to an axle of a vehicle.

3. The traction assembly of claim 1, wherein at least one of said plurality of linkages partially overlay said suspension assembly.

4. The traction assembly of claim 1, wherein said vehicle comprises a suspension and wherein said vehicle suspension is replaced by a rigid bar.

5. The traction assembly of claim 4, wherein said rigid bar is adjustable in length.

6. The traction assembly of claim 1, wherein said plurality of linkages and said suspension assembly have a mass, wherein said sprocket wheel and said frame have a mass, wherein an important proportion of said mass of said plurality of linkages and of said suspension assembly is sprung mass and wherein said mass of said sprocket wheel and of said frame is sprung mass.

7. The traction assembly of claim 1, wherein the least one of the linkages comprising an aperture entirely overlapping the circumference of the suspension at a specific position along the suspension.

8. A traction assembly for use on a vehicle, said traction assembly comprising:
   a) a sprocket wheel;
   b) a frame;
   c) a guide rail pivotally supporting a plurality of wheels;
   d) a supporting structure interconnecting said frame and said guide rail, said supporting structure comprising articulated linkages;
   e) a suspension comprising a spring assembly and a dampener, said suspension being pivotally connected to said frame and to said guide rail;
   f) a traction band disposed about the sprocket wheel and the plurality of wheels;
   wherein an important proportion of the mass of said linkages and of said suspension is sprung mass, wherein a mass of said sprocket wheel and of said frame is sprung mass and wherein at least one of the linkages comprises an aperture and wherein said suspension extends through said aperture.

9. The traction assembly of claim 8, wherein at least one of the linkages partially overlay said suspension.

10. The traction assembly of claim 8, wherein the least one of the linkages comprising an aperture entirely overlapping the circumference of the suspension at a specific position along the suspension.

11. A traction assembly for a vehicle having a first ratio of sprung mass to unsprung mass, the traction assembly comprising:
    a) a sprocket wheel configured to be mounted to the vehicle;
    b) a supporting structure comprising a suspension assembly;
    c) idler wheels pivotally mounted to the supporting structure;
    d) road wheels pivotally mounted to the supporting structure;
    e) a traction band disposed about the sprocket wheel, the idler wheels and a road;
    wherein when the traction assembly mounted to the vehicle, the suspension assembly of the traction assembly causes the vehicle to have a second ratio of sprung mass to unsprung mass, the second ratio being different from the first ratio.

12. A traction assembly as claimed in claim 11, wherein the second ratio is greater than the first ratio.

* * * * *